(12) United States Patent
Botrel et al.

(10) Patent No.: US 9,657,579 B2
(45) Date of Patent: May 23, 2017

(54) COOLED VANE OF A HIGH-PRESSURE TURBINE

(71) Applicant: SNECMA, Paris (FR)

(72) Inventors: Erwan Daniel Botrel, Moissy Cramayel (FR); Charlotte Marie Dujol, Moissy Cramayel (FR)

(73) Assignee: SNECMA, Paris (FR)

(*) Notice: Subject to any disclaimer, the term of this patent is extended or adjusted under 35 U.S.C. 154(b) by 262 days.

(21) Appl. No.: 14/427,295

(22) PCT Filed: Sep. 12, 2013

(86) PCT No.: PCT/FR2013/052102
§ 371 (c)(1),
(2) Date: Mar. 10, 2015

(87) PCT Pub. No.: WO2014/041311
PCT Pub. Date: Mar. 20, 2014

(65) Prior Publication Data
US 2015/0240649 A1 Aug. 27, 2015

(30) Foreign Application Priority Data
Sep. 13, 2012 (FR) ...................................... 12 58626

(51) Int. Cl.
*F01D 5/08* (2006.01)
*F01D 5/18* (2006.01)

(52) U.S. Cl.
CPC ............. *F01D 5/186* (2013.01); *F01D 5/081* (2013.01); *F01D 5/085* (2013.01); *F01D 5/18* (2013.01);
(Continued)

(58) Field of Classification Search
CPC . F01D 5/081; F01D 5/085; F01D 5/18; F01D 5/186; F05D 2220/32;
(Continued)

(56) References Cited

U.S. PATENT DOCUMENTS 3,706,508 A * 12/1972 Moskowitz ............. F01D 5/183
415/115
4,236,870 A * 12/1980 Hucul, Jr. ............... F01D 5/187
415/115
(Continued)

FOREIGN PATENT DOCUMENTS

DE 10 2004 037 444 A1 10/2005
DE 20 2011 109 225 U1 4/2012
(Continued)

*Primary Examiner* — Igor Kershteyn
(74) *Attorney, Agent, or Firm* — Blakely Sokoloff Taylor & Zafman LLP

(57) ABSTRACT

The invention relates to a movable vane of a turbomachine comprising a blade (12) with inner cooling cavities and a root (11) by which means the vane can be mounted on a rotor disk, the root comprising at least two channels (11a) communicating with said inner cavities and leading to the base (11b) thereof, said base comprising at least two openings (11b1, 11b2) through which the channels open up, and a calibrating plate (20) provided with calibrated perforations (21, 22) corresponding to said openings being attached to the base (11b) of the root. The vane is characterized in that a mechanical means (25, 26; 11m1, 11m2) forming a sealing barrier between the two openings is arranged between the plate and the base of the root.

8 Claims, 2 Drawing Sheets

(52) U.S. Cl.
CPC .... *F05D 2220/32* (2013.01); *F05D 2230/237* (2013.01); *F05D 2240/55* (2013.01); *Y02T 50/673* (2013.01); *Y02T 50/676* (2013.01)

(58) Field of Classification Search
CPC ........... F05D 2230/237; F05D 2240/55; Y02T 50/673; Y02T 50/676
See application file for complete search history.

(56) References Cited

U.S. PATENT DOCUMENTS

| | | | | | |
|---|---|---|---|---|---|
| 4,453,888 | A | * | 6/1984 | Hovan | F01D 5/18 415/175 |
| 4,582,467 | A | * | 4/1986 | Kisling | F01D 5/3015 415/115 |
| 4,775,296 | A | * | 10/1988 | Schwarzmann | F01D 5/187 415/115 |
| 6,832,889 | B1 | * | 12/2004 | Lee | F01D 5/184 415/115 |
| 2002/0119045 | A1 | * | 8/2002 | Starkweather | F01D 5/187 416/97 R |
| 2004/0151580 | A1 | | 8/2004 | Helder et al. | |
| 2006/0062671 | A1 | * | 3/2006 | Lee | F01D 5/081 416/92 |
| 2008/0118366 | A1 | * | 5/2008 | Correia | F01D 5/187 416/97 R |
| 2012/0163995 | A1 | * | 6/2012 | Wardle | F01D 5/081 416/97 R |

FOREIGN PATENT DOCUMENTS

| | | |
|---|---|---|
| EP | 1 832 712 A1 | 9/2007 |
| EP | 1 923 537 A2 | 5/2008 |
| WO | WO 2010/046584 A1 | 10/2009 |

\* cited by examiner

COOLED VANE OF A HIGH-PRESSURE TURBINE

TECHNICAL FIELD

The present invention relates to the field of turbine engines and concerns a turbine vane cooled by means of a coolant, said coolant circulating internally.

PRIOR ART

A turbine engine is a rotating machine in which a transfer of energy occurs between the flow of a fluid and a system of vanes which are rigidly connected to a rotor, for example a compressor or a turbine forming part of a turboshaft engine such as a gas turbine engine. A gas turbine turboshaft engine for an aircraft, such as a multi-flow turbojet engine, generally comprises, from upstream to downstream in the direction of flow of the gases, a fan, one or more compressor stages, for example a low-pressure compressor and a high-pressure compressor, a combustion chamber, one or more turbine stages, for example a high-pressure turbine and a low-pressure turbine, and a gas exhaust pipe. A turbine can correspond to each compressor, the two being connected by a shaft, thus forming, for example, a high-pressure rotor and a low-pressure rotor.

The turbine of the high-pressure rotor is arranged immediately downstream of the combustion chamber and is fed by the gaseous flow produced from the chamber. The temperature of the gases is as high as the material constituting the turbine can withstand, because the thermodynamic efficiency of the engine and the specific consumption related thereto depend on it.

The vanes of the high-pressure turbine are manufactured from alloys which are resistant to high temperatures and are provided with inner cooling means, in order to enable them to withstand extreme operating conditions. In particular, the movable vanes of the high-pressure turbine of the gas turbine engine are provided with inner cavities in which a coolant circulates. The coolant is constituted by air taken off at the high-pressure compressor.

Overall the vanes comprise three parts: a blade with an aerodynamic form, a root by which the blade is attached to the rotor disc by being lodged in the recesses machined on the rim of the disc, and a platform between the blade and the vane ensuring continuity of the stream. According to one cooling technique, the air is guided along or across the disc up to the bottom of the recesses thereof, from where it is injected into the vanes through openings made in the base of the root of said vanes. The air is distributed by these openings into channels which pass through the root and which communicate with the inner cavities of the blade. The air circulates in these cavities along the inner face of the walls of the blade and is then expelled into the engine flow stream by perforations distributed in particular along the edges of the blade. A technique of this type is described in document WO 2010/046584 in the name of the present applicant; the openings are made on the face of the vane root which faces the bottom of the recess of the disc in which the root is lodged. This face of the vane root is hereinafter referred to as the 'base'. It is rectangular in shape. The openings in each of the channels are aligned longitudinally on said base, between the upstream edge and downstream edge.

The cooling flow injected into the movable vanes results from a compromise between the requirement for the best cooling possible and control of the specific consumption of the engine. To this end, a perforated plate, known as a calibrating plate, is attached to the base of the vane root in order to calibrate the flow of air injected into each cavity of the cooling circuit and therefore ensure thermal levels which are compatible with the service life requirements of the part.

The distribution of the flow is also optimised to guarantee a minimal overpressure ratio ratio between the pressure in the stream and in the inner cavities at the perforations and thus to avoid any reintroduction of hot air from the stream into the vane.

In order to ensure control of the flow of the cooling air, it is sufficient to adjust the dimensions of the perforations in the calibrating plate according to test feedback, without having to modify the already machined vane.

According to the prior art, the calibrating plate is brazed onto the vane root, the sealing between the different channels in the circuit being ensured by a brazing strip which takes on the form of the plate. This method of connecting by brazing is well known but requires expensive operations relating to the need for a furnace, which operations it would be desirable to reduce. Furthermore, if the calibrating apertures have a very small diameter, additional operations must be provided for in order to avoid blocking of said apertures by overrunning brazing.

The invention therefore relates to the attachment of this calibrating plate to the base of the vane root in an optimal manner in terms of sealing effectiveness and manufacturing costs.

In order to avoid the brazing operation, it has been proposed to attach the calibrating plate to the vane root by means of an autogenous lap weld, in particular using a laser beam. This welding method consists in connecting the plate around the edge without adding material when applying the laser beam along the region of contact with the vane. A transparent weld is made in the separation regions located between the feed openings in the cooling channels in order to form seals which separate the openings from one another.

However, it will be noted that the transparent welding is likely to cause the appearance of cracks in the vane root. These cracks can spread and damage the part.

Eliminating this weld in the separation regions would enable the problem linked to the risk of crack formation to be solved. However, this solution would lead to the elimination of the seals and the risk of causing leaks of calibrated air between the different cavities of the cooling circuit. A new distribution of the cooling air flow in the vane would then follow. The thermal behaviour of the vane as well as the overpressure ratios would be changed, which would call into question:
  the certified service life; the distribution of the thermal behaviour of the blade,
  the integrity of the vane; the minimum overpressure ratio leading to a risk of burning,
  the certified efficiency of the high-pressure turbine leading to an increase in the rate of cooling of the vane.

SUMMARY OF THE INVENTION

The object of the invention is to provide a means for connecting the calibrating plate to the vane root, said means ensuring sealing between the different channels for the calibrated air, i.e. the air which has passed through the calibrated perforations in the calibrating plate. This attachment means must be advantageous in terms of cost and must not present a risk of crack formation on the part.

This object is achieved by a movable turbine engine vane comprising a blade having inner cooling cavities and a root by means of which the vane can be mounted on a rotor disc, the root comprising at least two channels communicating with said inner cavities and opening out via the base of the root, said base comprising at least two openings through which the channels open out, and a calibrating plate provided with calibrated perforations corresponding to said openings being attached to the base of the root. This movable vane is characterised in that a mechanical means forming a sealing barrier between the two openings is arranged between the plate and the base of the vane root.

'Mechanical sealing means' is understood as being a means which prevents circulation of the calibrated air from one opening to another, said means not applying techniques of welding or brazing between the plate and the vane root in the separation regions between the openings.

More particularly, the mechanical means forming a sealing barrier comprises a tenon arranged on the plate or the base of the root, and a mortise arranged facing the tenon on the base or plate, the tenon being slotted into the mortise.

The tenon is preferably arranged on the plate and the mortise on the vane root.

Advantageously, at least one face of the tenon is in contact with a wall of the mortise, in such a way as to prevent any passage of gas between the tenon and the mortise.

The tenon may have different shapes, for example it may have a trapezoidal or rounded cross section.

The plate can also be attached by a mechanical holding means, but it is preferably attached to the vane root by autogenous welding, particularly by laser. More particularly, the weld is a lap weld, the connection being realised around the perimeter of the plate.

The vane generally comprises between two and six openings on the base, mechanical sealing means being arranged in the separation regions between the openings.

BRIEF DESCRIPTION OF THE FIGURES

The invention will be better understood, and other objects, details, features and advantages thereof will become clearer, with the aid of the following detailed explanatory description of an embodiment of the invention given purely by way of illustrative and non-limiting example, with reference to the accompanying drawings, in which.

DETAILED DESCRIPTION OF THE INVENTION

Figure 1:
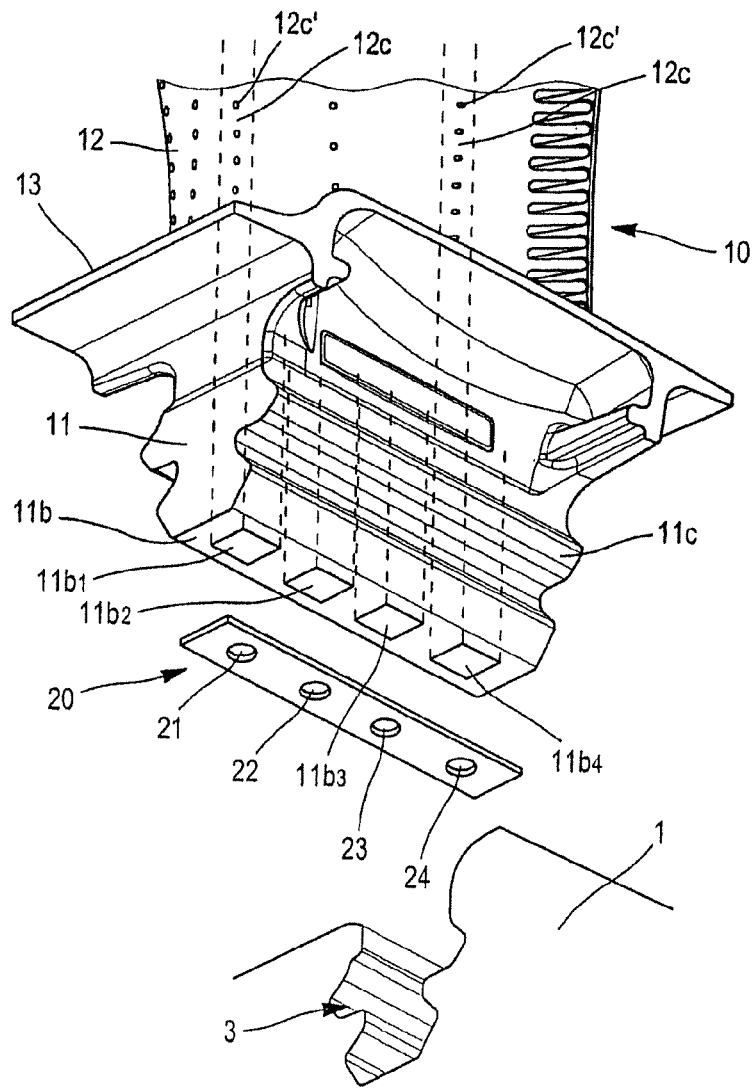
FIG. 1 is a perspective exploded view of a movable turbine vane, the calibrating plate, and part of the turbine disc.
Figure 2:
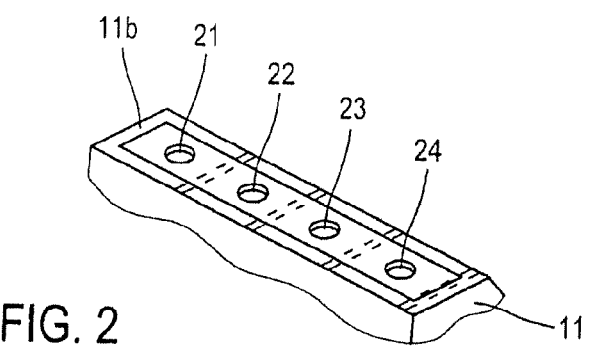
FIG. 2 is a view from below of the vane root and the calibrating plate attached to the base of the root.

A rotor of an axial, high-pressure turbine comprises a disc 1 and a plurality of vanes 10 which are attached radially to the rim thereof. The vanes comprise a root 11, a blade 12 and a platform 13 between the root and the blade 12. The vanes are lodged by their root in axial recesses 3 machined in the rim of the disc 1. The root 11 and the sides of the recess are shaped, the section here said to have the shape of a fir tree, in such a way as to hold and ensure the retention of the vane in the recess thereof when the disc 20 is driven in rotation about its axis. The blade 12 of aerodynamic form extends radially over the height of the gas stream, and the platform arranged transversely in relation to the axis of the vane forms a radially inner wall element of the stream. The vane is cooled in order to ensure resistance to the high temperatures of the gas engine. The vane is hollow with a plurality of inner cavities in which the cooling air circulates. To this end and according to this embodiment, air inlets are provided in the base of the vane. This base is planar, perpendicular to the axis of the vane, and of rectangular shape. The base 11b of the root 11 of the vane comprises a plurality of openings, here 4, 11b1 to 11b4, which communicate with inner channels 11c in the root 11. The channels are extended inside the blade 12 by cavities 12c made between the pressure face and the suction face of the blade, which cavities open out on the exterior via perforations 12c'. The vane is generally produced according to the lost-wax casting technique, with final machining. In order to be able to adjust the flow of air feeding the cooling circuits of the vane, a calibrating plate 20 is arranged on the base 11b with calibrated apertures 21 to 24 opposite the openings 11b1 to 11b4 in the base. As can be seen in FIG. 2, the plate is attached to the root 11 by welding onto the base 11b along the perimeter thereof.

Figure 3:
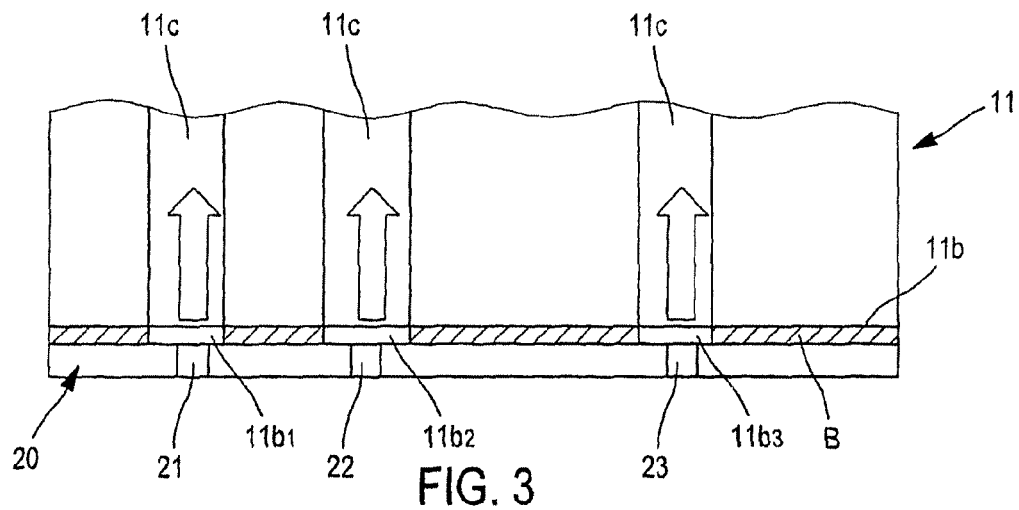
FIG. 3 is a cross section of the plate positioned on the inner face of the vane root according to the prior art and connected by brazing.

FIG. 3 shows the solution of the prior art, in longitudinal section. The calibrating plate 20 with the perforations 21, 22 and 23 is connected to the base 11b by means of a brazing strip B. The brazing connects the plate to the base over the entire perimeter, as well as in the regions between the openings 11b1, 11b2, 11b3. In this way, the sealing of the calibrated air is ensured between the channels 11c of the root.

Figure 4:
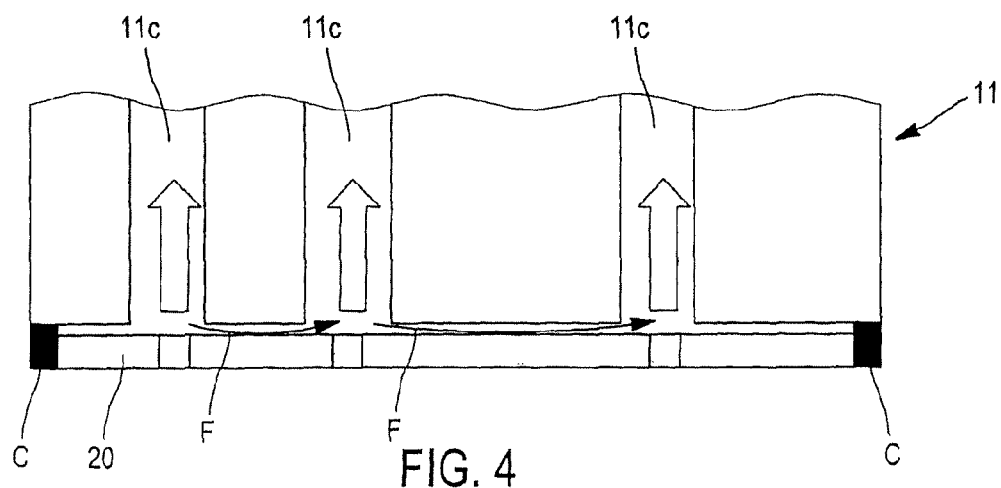
FIG. 4 is a cross section of the plate positioned on the inner face of the vane root according to an embodiment without seals between the adjacent apertures, and not according to the invention.

In order to avoid problems resulting from the brazing of the plate, an autogenous lap weld C is envisaged around the edge of the plate. In this case, the regions between the apertures are free from welding in such a way as to avoid cracking problems which are likely to be created by a weld. However, it is not possible to avoid leaks between the cavities, as can be seen in FIG. 4. The arrows F illustrate the circulation of calibrated air from one cavity to another. This circulation should be avoided.

Figure 5:
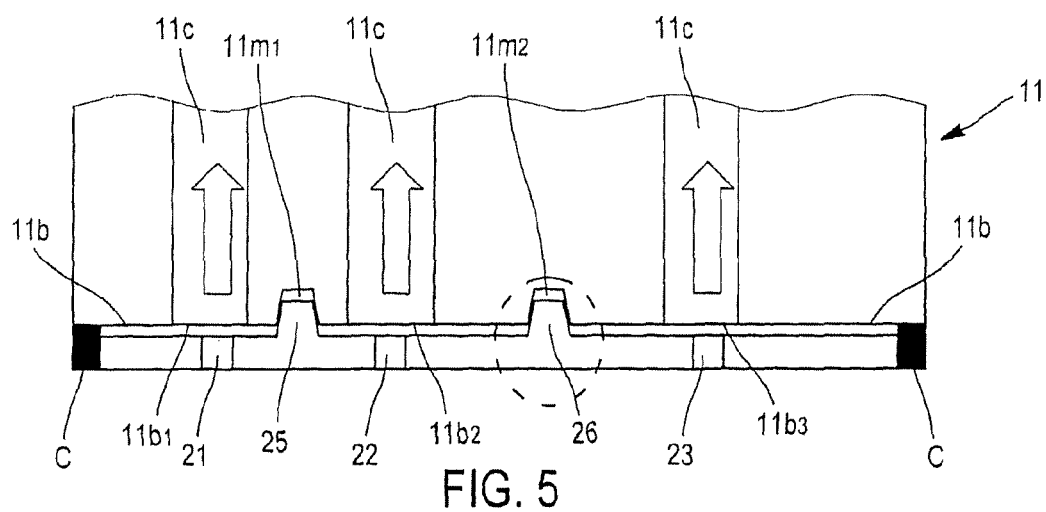
FIG. 5 is a cross section of the plate positioned on the inner face of the vane root, according to the invention.

The solution of the invention consists in producing mechanical sealing devices between the cavities, as shown in FIG. 5. A tenon and mortise connection is produced between the plate and the base of the root in these regions. According to the embodiment shown, the plate 20 comprises tenons 25 and 26 between the calibrated apertures 21 and 22 on the one hand, and 22 and 23 on the other hand. These tenons extend transversely from one longitudinal edge of the plate to the other. The shape of the cross section thereof is trapezoidal here. The tenons cooperate with mortises (11m1, 11m2) of complementary form which are machined in the base 11b of the root 11. The sides of the tenons are in contact with the sides of the mortise so as to ensure the sealing between the channels 11c.

FIG. 5 shows the preferred arrangement, but the tenons and mortises can, of course, be inverted to obtain the same result.

In the same way, the shapes of the surfaces which are in contact and ensure the sealing can vary. For example, the tenons may have a circular-arc-shaped cross section.

To mount the plate, it is simply attached to the base 11b, preferably by an autogenous lap weld carried out by means of a laser beam, for example. Other heating means are conceivable. In the context of the solution, a connection by brazing a strip or other means is also possible. The connection is ensured only along the perimeter of the plate; the space between the channels 11c remains unconnected. The sealing between the channels 11c for the calibrated air is ensured by the tenons which are engaged in the mortises.

The invention claimed is:

1. Movable vane of a turbine engine comprising a blade having inner cooling cavities and a root by means of which the vane can be mounted on a rotor disc, the root comprising at least two channels communicating with said inner cavities and opening out on the base, said base comprising at least two openings through which the channels open out, and a calibrating plate provided with calibrated perforations corresponding to said openings being attached to the base of the root, characterised in that a mechanical means forming a sealing barrier between the two openings is arranged between the plate and the base of the root, said means comprising a tenon arranged on the plate or base of the root and a mortise arranged facing the tenon on the base or plate, the tenon being slotted into the mortise.

2. Vane according to claim 1, wherein at least one face of the tenon is in contact with the wall of the mortise in such a way as to prevent any passage of gas between the tenon and the mortise.

3. Vane according to claim 1, wherein the tenon has a trapezoidal cross section.

4. Vane according to claim 1, wherein the tenon has a rounded cross section.

5. Vane according to claim 1, wherein the plate is attached to the vane root by autogenous welding.

6. Vane according to claim 5, wherein the weld is a lap weld around the perimeter of the plate.

7. Vane according to claim 1 wherein the plate is attached by brazing.

8. Vane according to claim 1, comprising between two and six openings on the base, mechanical sealing means being arranged in the separation regions between the openings.

* * * * *